United States Patent [19]
Bloomstein

[11] 4,260,229
[45] Apr. 7, 1981

[54] CREATING VISUAL IMAGES OF LIP MOVEMENTS

[76] Inventor: Richard W. Bloomstein, 1443 Cavell, Highland Park, Ill. 60035

[21] Appl. No.: 871,538

[22] Filed: Jan. 23, 1978

[51] Int. Cl.³ .............................................. G03B 21/32
[52] U.S. Cl. .......................................... 352/50; 352/87
[58] Field of Search ............... 352/87, 50; 340/324 A, 340/324 AD, 705, 725, 707; 358/82; 364/602, 855, 858

[56] References Cited
U.S. PATENT DOCUMENTS

| | | | |
|---|---|---|---|
| 3,364,382 | 1/1968 | Harrison | 340/324 A |
| 3,510,210 | 5/1970 | Haney | 352/50 |
| 3,662,374 | 5/1972 | Harrison et al. | 352/87 |
| 3,747,087 | 7/1973 | Harrison et al. | 352/87 |

*Primary Examiner*—L. T. Hix
*Assistant Examiner*—W. J. Brady
*Attorney, Agent, or Firm*—Trexler, Wolters, Bushnell & Fosse, Ltd.

[57] ABSTRACT

A system and method that creates visual images of lip movements on film, video tape, or other recorded media. Speech sounds are analyzed, digitally encoded and transmitted to a data memory device. Stored within the data memory device is a program for producing output data that creates visual images of lip movements corresponding to the speech sounds. Under control of the data for the speech sounds, the graphical output from the data memory device is sent to a graphic output device and related display equipment to produce the graphical display. This display may be combined with the speech sounds so that the resultant audio-visual composite (e.g. a film strip) contain lip movements corresponding to the speech sounds.

8 Claims, 4 Drawing Figures

CREATING VISUAL IMAGES OF LIP MOVEMENTS

BACKGROUND OF THE INVENTION

This invention relates to systems and methods for creating visual images responsive to analyzed speech data so as to produce a graphicl representation of known type such as the lip movements corresponding to the speech sounds. The invention is particularly suitable for creating visual images of lip movements in films, video tapes, and on other recorded media.

In the production of many types of audio-visual media the speech sounds and the visual images are recorded simultaneously. For example, in the making of motion pictures or like audio visual recordings, the voice of the actor is recorded on the sound track at the same time that the actor is emitting speech sounds. Where the film is intended to be played as originally produced, the speech sounds of the sound track correspond to the lip movements emitted. However, it frequently happens that the audio portion or sound track is to be in a language other than the original one spoken by the actor. Under such circumstances a new sound tract in another language is "dubbed". When this is done the speech sounds do not correspond to the lip movements, resulting in an audio-visual presentation that looks unreal or inferior.

In animated cartoons it is also a problem to provide lip movements which correspond to the speech sound. This may be done, however, by utilizing individual art work or drawings for the lip movements, sometimes as many as several per second. Because of the necessity of making numerous drawings by hand or other laborious art techniques, the cost of animated cartoons tend to be expensive.

SUMMARY OF THE INVENTION

In accordance with this invention predetermined visual images such as lip movements are graphically created to correspond with speech sounds so that when the visual images and speech sounds are recorded on film, video tape or other media, the presentation (listening and viewing) will tend to be more real and interesting. The method and apparatus of the invention creates graphical images with a minimum of human effort by the unique utilization of computerized graphic techniques.

In further accordance with this invention there is provided a coded representation of speech sounds. These speech sounds may be associated with lip movements from visual information, which lip movements do not correspond to the speech sounds as in a "dubbed in" sound track of a motion picture. The coded representations of the speech sounds are transmitted to a data memory device (e.g. computer) for storage therein. There is also stored in the data memory device coded data for creating a predetermined graphical representation (e.g. lip movements) corresponding to the speech sounds. This coded data or software is intended to respond to the coded date representing the speech sound so that the coded speech sounds can instruct the computer to send out graphical signals of new lip movements or other graphical representation corresponding to the speech sounds. The new lip movement data is thus transmitted to a graphic output device of known type from which a suitable graphic display may be created. This graphic display may be, for example, a video display or a film frame. The audio or speech portions may be combined in correlation with the graphical display.

When a motion picture film having a "dubbed in" sound track in which lip movements are not in correspondence with the speech sounds, the encoding of the lip movements may be done on a frame-by-frame basis. Thus, the coded speech sounds may be extracted from the sound track, frame-by-frame, and sent to the computer. Likewise, the computer may receive information as to the mouth position on each frame as well as information relating to the mouth shape of the actor. The entire film may be optically scanned on a frame-by-frame basis so that each frame with mouth location and mouth configuration data may be stored in the computer in digital form along with data in digital form as to the analyzed speech sounds. When the information is sent out from the computer to the the graphical output device, the data for the speech sounds causes the computer to send out the proper graphical output signals to the graphical output device corresponding to the particular speech sounds on the sound track of the film. Thus, the film is reconstructed to the extent necessary to change the mouth shape and lip movement or configuration to correspond with the speech sound.

Typical apparatus of the present invention for creating visual images of lip movements comprises means such as a speech analyzer for providing a coded representation of speech sounds, a data memory device, means for transmitting said coded representation to said date memory device for storage therein, said date memory device having stored therein coded date for creating a graphical representation of lip movements corresponding to the speech sounds, a graphical output device, and means for transmitting to said graphical output device and under control of the coded speech representation data for the lip movements corresponding to the speech sounds.

The apparatus further includes means for extracting the coded speech sounds from a series of frames of audio and visual information, means for transmitting said coded speech sounds to said data memory device on a frame-by-frame basis for storage therein on that basis. Means are also provided for optically scanning a series of frames in sequence to provide an encoded graphical image of the visual information. Means are provided for transmitting the encoded graphical image data to the computer or data memory device. Means are also provided for transmitting from the data memory device to the graphical output device the visual information data plus the data for the new lip movements which, in a corrected film, replace the old lip movements on the film.

DETAILED DESCRIPTION

Figure 1:
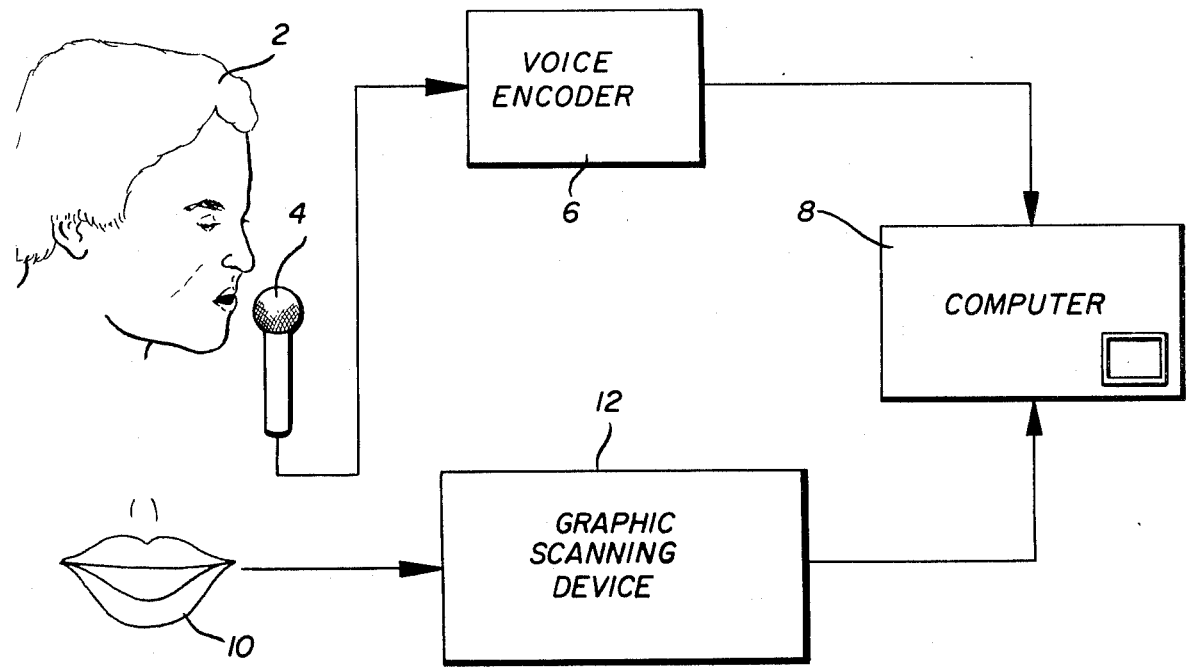
FIG. 1 is a diagram showing the arrangement for storing of phoneme and graphic codes and forming part of the present invention.

Referring now in more detail to the drawing, and particularly to FIG. 1, there is shown an arrangement for storing phoneme and graphic codes into a digital electronic computer. One set of codes represents the spoken phoneme of a language (e.g. the English language). The other codes are graphic codes representing visual images of lips of various mouth types such as male, female, cartoon animal, etc. together with orientations of the mouth such as front view, three quarter view, side view, etc.

More particularly, a person such as an actor pronounces phoneme into a voice encoder. The voice encoder translates the phoneme into a digital electronic phoneme code which is transmitted to a digital computer and stored in its memory. A phoneme for entire language may be thus be digitally coded. In conjunction with the phoneme code an artist may draw one or more mouth shapes. A programmer or electronic graphic scanning device encodes the artist's drawing into graphic code, which code is also sent for storage into the electronic digital computer. The foregoing is repeated until a complete set of phoneme and graphic codes are stored in digital form representing the basic phoneme code, standard mouth types and orientations, etc. as heretofore stated.

A phoneme code is a representation of intensities of sound over a specified series of frequencies. The number of frequencies selected depends upon the degree of refinement of the code. Typically, three frequencies may be used to obtain three intensities (decibel level), one for each frequency. The English language has sixty-two phonemes. Thus, each of the sixty-two phonemes will be coded at three selected frequencies. A discussion of voice analysis may be found in the publication *Interface Age*, issue of May 5, 1977, pages 56–67.

Thus, an actor 2, speaking into a microphone 4 transmits phoneme to a voice encoder 6, which digitally encodes the phoneme and transmits the encoded data to a data memory device 8. This data memory device may be any known type of electronic digital computer. An example is the model PDP-11/40 of Digital Equipment Corporation, Maynard, Mass. An artist may produce a drawing 10 of a particular lip or mouth shape. This drawing 10 may be graphically encoded by the programmer or electronic graphic scanning device 12. This unit may be of the type described in U.S. Pat. No. 3,728,576 and is basically an optical scanner which encodes the artist's drawing into a graphic digital code for transmission to the computer 8.

The voice encoder 6, previously referred to, is sometimes known as a speech encoder and is a known piece of equipment. Such a device is sold under the trademark SPEECH LAB and is obtainable from Heuristics, Inc. of Los Altos, Calif. The voice encoder 6 is a device which translates the phoneme into a digital electronic phoneme code.

The artist will draw as many mouth or lip shapes 10 as may be necessary to encode the computer 8 with a complete phoneme language code and all of the mouth or lip shapes which may be needed for subsequent graphical reproduction.

Figure 2:
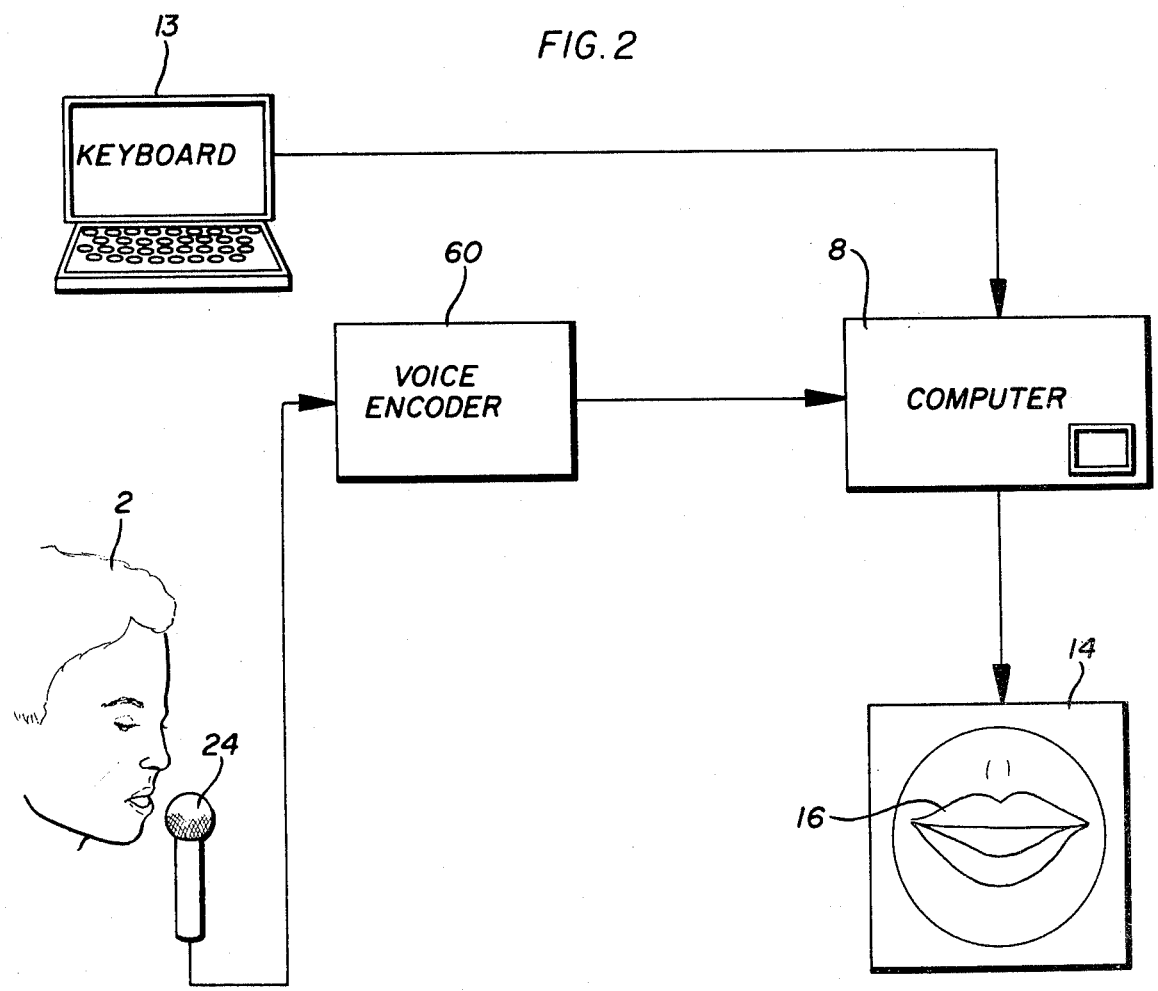
FIG. 2 is a diagram showing the manner of using the codes to display visual images.

Referring now to FIG. 2, there is shown the output or playback mode of the present invention. A keyboard 13 is used to select a mouth type (male, female, etc.) orientation front, three-quarter, side, etc. from among the previously encoded lip or mouth shapes. The keyboard is of a known type and may be, for example, a DEC LA 36 DECWRITER II and/or VT 50 DECSCOPE, products of Digital Equipment Corporation. The keyboard 13 is connected to the computer 8 so that the mouth type, mouth orientation, etc. may be chosen by keying in the desired selection.

The actor 2 speaking in the microphone 24 reads a script or other voice material into the voice encoder 60 which is similar to the voice encoder 6 previously described. The voice encoder 60 translates the actor's voice into a digital electronic voice code. The output of the encoder 60 is transmitted to the computer 8. Under control of the keyed-in signal from the keyboard 13 and of the encoded output of the voice encoder 60, the data memory device or computer 8 sends to display device 14 signals corresponding to the selected graphic code from its memory and also the phoneme code which most closely matches the actor's encoded voice. This display device 14 converts the graphic codes and size information into visual information such as the lip shape 16 shown. The visual images 16 can be recorded on film or other audio/visual media. For example, visual images may be enlarged into framed transparencies for overlay into compounded frames.

Thus, the playback mode of the present arrangement shown in FIG. 2 allows a simple selection of mouth orientation and related mouth characteristics to be simply keyed into the computer which has the various mouth information stored therein. At the same time the voice of the actor 2 may be encoded to provide an input signal to the computer causing it to produce a phoneme output most nearly in accordance with the coded signals. As a result, the output from the computer 8 to the graphic display 14 is controlled by the keyboard input from the keyboard 12 and the output from the voice encoders 60, the latter of which determines the lip configuration shown in the graphic display 16. Thus, if the actor pronounces an "ah" sound into microphone 24, the coded input signal to the computer 8 will find or select the nearest phoneme code in accordance with known data comparison techniques. This code will then be used to provide a predetermined output to display device 14 that will result in an "ah" shaped lip configuration in display 16.

The graphic display device 14 is itself a known item and may, for example, be a RAMTEK G-100-A color display system, sold by Ramtek corporation of Sunnydale, Calif.

It is possible to overlay directly the constructed visual image 16 onto an existing film or other audio/visual medium automatically. In such procedure the original film is converted by an electronic graphic scanning device, such as is shown at 12 in FIG. 1 and previously described, into what is known as "pixels". These are electronic digital codes representing the light intensity at a large number of points on the screen. The "pixels" are analyzed by an electronic digital computer by various algorithns to determine the size, orientation and/or location of features (in this case the mouth). The pixels in the local region of the located mouth can be replaced in the electronic digital computer memory by existing computer instructions of graphic codes from the sets of phoneme graphic codes stored previously therein and selected by the arrangement shown and described with respect to FIG. 2. The resulting pixels representing the original frame with mouth replaced can be sent to an electronic graphic display device for display and recording.

Figure 3:
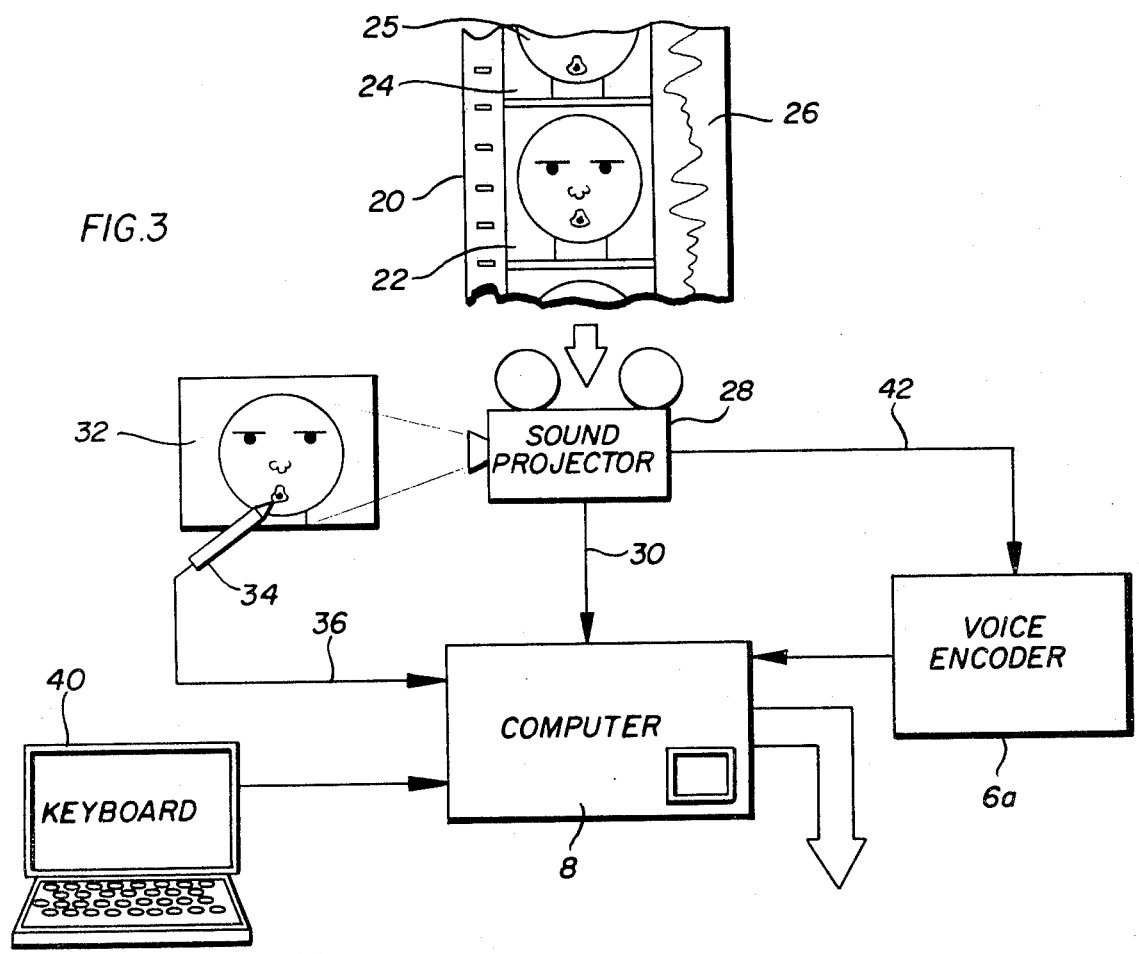
FIG. 3 is a modified form of the invention showing the encoding of lip movement corrections.
Figure 4:
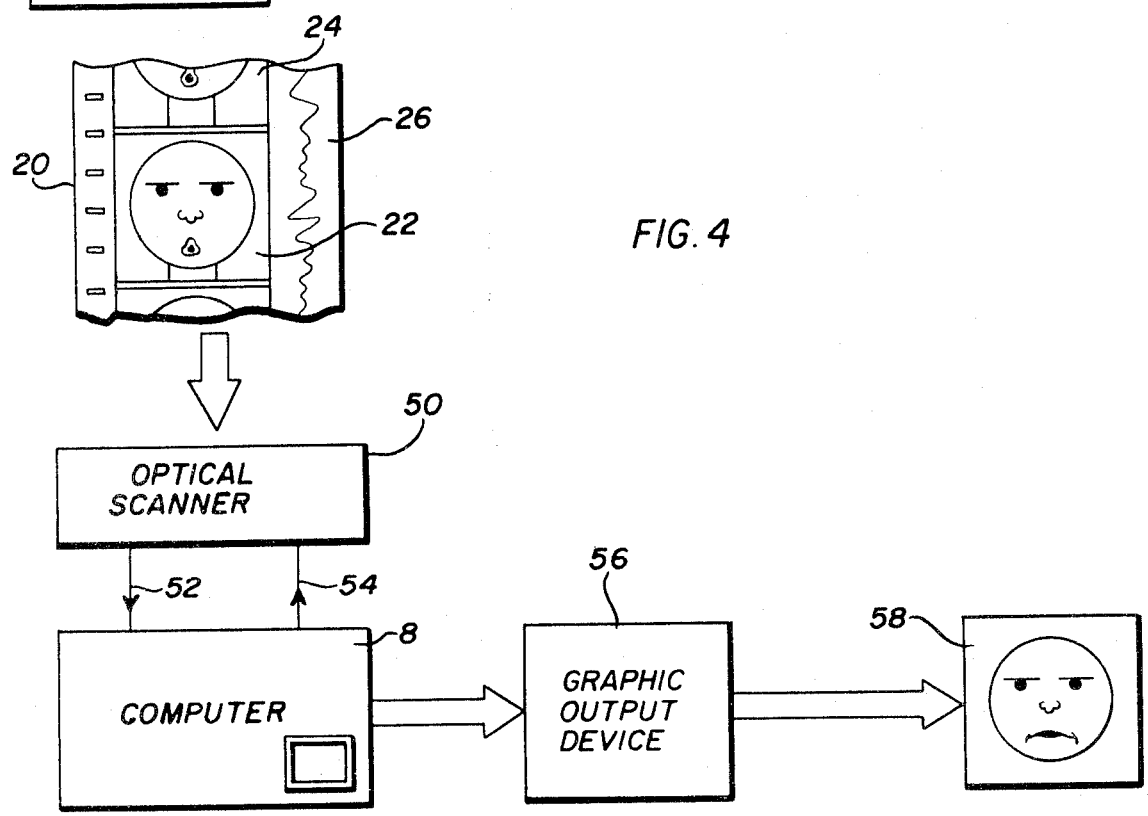
FIG. 4 is a diagram showing an arrangement for graphically displaying the lip movement corrections encoded by the arrangement of FIG. 3.

FIG. 3 and FIG. 4 show a modified form of the invention which may be used for correcting the lip movements in motion picture film. FIG. 3 shows a motion picture film 20 having a series of frames 22,24 etc. that include a visual image 25 and a sound track 26. The sound of the sound track may be a foreign language dubbed in, resulting in a sound which does not correspond to the lip movements in the various frames. Accordingly, the film 20 may be run through a sound projector 28 that embodies a frame counter that sends frame count output pulses over conductor 30 to the digital memory device or computer 8. The sound projector 28 also projects an image 32 on a suitable screen. This screen may be a so-called interactive graphic tablet. A stylus 34 is used in a known fashion to select the mouth position relative to coordinates on the graphic tablet 32. The stylus 34 records the position of the mouth as a digital code and in accordance with known techniques transmits the information over a conductor 36 for storage into the computer 8. If needed, a keyboard 40 is also utilized whereby data representing a mouth type or other configuration may be transmitted to the computer 8.

An encoder 6a may also be used and is of the type similar to the encoder 6 previously described. This encoder transmits the digital phoneme into the computer 8. Furthermore, the output sound from the projector as an electrical signal is transmitted over conductor 42 to the encoder 6a, such electrical signal representing the output sound from the sound track 26.

Thus, the digital computer 8 has stored therein considerable data in coded form. This data consists of the frame counts, the mouth position, the phoneme code, and the mouth type.

Turning now to FIG. 4, the playback or output arrangement is shown. The images 25 of frames 22,24 etc. are scanned by a conventional optical scanner 50 which sends a digitally coded image for each frame over conductor 52 to the computer 8. At the same time a pulse advance is supplied over conductor 54 to advance the frame of the film. The output signal from the digital computer 8 is sent to a graphic output device 56 which provides a graphic display 58 that has the new lip movements thereon. Thus, the arrangement provides for the encoding of the sound from the sound track 26 and utilizing that data to create a new lip configuration corresponding to the sound of the sound track. The graphic display 58 may be recombined with the sound in the form of a new film videotape, or the like.

The invention is claimed as follows:

1. A method of graphically creating lip images which comprises providing a phoneme encoded representation of speech sounds, providing an encoded representation of selected lip configurations, transmitting both of said encoded representations to a data memory device for storage therein, and transmitting from said data memory device to a graphical output device and under control of a coded speech input and a coded selected lip configuration, both of which are transmitted to said data memory device, coded signals that cause said graphical display device to display lip images approximately corresponding to the uncoded form of said coded speech input.

2. A method according to claim 1 in which the coded speech input selects a phoneme output from the data memory device, which phoneme output most nearly represents the speech input.

3. A method of creating visual images of lip movements corresponding to speech sounds comprising providing a coded representation of speech sounds that are associated with lip movements from visual information, which lip movements do not correspond to the speech sounds, transmitting said coded representation to a data memory device for storage therein, storing in said data memory device coded data for creating a graphical representation of new lip movements corresponding to the speech sounds, and transmitting from said data memory device to a graphical output device and under control of the data representing the coded speech data for the new lip movements corresponding to said speech sounds.

4. A method according to claim 3 including extracting the coded speech sounds from a series of frames of audio and said visual information, storing said coded speech sounds in said data memory device on a frame-by-frame basis, optically scanning said series of frames in sequence to provide an encoded graphical image of the visual information and transmitting the encoded graphical image data to said data memory device, and transmitting from said data memory device to said graphical output device the visual information data and the data for the new lip movements that replace the first-mentioned lip movements.

5. A method according to claim 4 in which the frames that are scanned are images from frames on a strip of photographic film, and the speech sounds are on a sound track for the film.

6. A method of creating audio-visual media having visual images and associated speech sounds comprising providing a coded representation of speech sounds, transmitting said coded representation to a data memory device for storage therein, storing in said data memory device coded data for creating graphical representations corresponding to the speech sounds, transmitting from said data memory device to a graphical output device and under control of the data for the coded speech representation the data for the graphical representations corresponding to the speech sounds, and combining the graphical representations with visual images in a predetermined manner on an audio-visual recorded medium.

7. Apparatus for creating visual images of lip movements corresponding to speech sounds comprising means for providing a coded representation of speech sounds that are associated with lip movements from visual information, a data memory device, means for transmitting said coded representation to said data memory device for storage therein, said data memory device having stored therein coded data for creating a graphical representation of predetermined lip movements corresponding to the speech sounds, a graphical output device, and means for transmitting to said graphical output device and under control of the coded speech representation data, the data for the predetermined lip movements corresponding to the speech sounds.

8. Apparatus according to claim 7 including means for extracting the coded speech sounds from a series of frames of audio and said visual information, means for transmitting said coded speech sounds to said data memory device on a frame-by-frame basis for storge therein on said basis, and means for optically scanning said series of frames in sequence to provide an encoded graphical image of the visual information.

* * * * *

UNITED STATES PATENT AND TRADEMARK OFFICE
CERTIFICATE OF CORRECTION

PATENT NO. : 4,260,229
DATED : April 7, 1981
INVENTOR(S) : RICHARD W. BLOOMSTEIN It is certified that error appears in the above-identified patent and that said Letters Patent are hereby corrected as shown below:

Column 1, line 8, change "graphicl" to --graphical--;
Column 1, line 25, change "tract" to --track--;
Column 1, line 25, change "dubbed" to --dubbed in--;
Column 1, line 61, change "date" to --data--;
Column 2, line 19, change "to the the graphical" to --to the graphical--;
Column 2, line 33, change "date" both occurrences to --data--;
Column 2, line 34, change "date" to --data--;
Column 3, line 18, change "may be thus be" to --may thus be--;
Column 4, line 58, change "algorithns" to --algorithms--.

Signed and Sealed this

Twenty-second Day of September 1981

[SEAL]

Attest:

GERALD J. MOSSINGHOFF

*Attesting Officer* — *Commissioner of Patents and Trademarks*